(12) United States Patent
Vigoda

(10) Patent No.: US 9,412,068 B2
(45) Date of Patent: Aug. 9, 2016

(54) DISTRIBUTED FACTOR GRAPH SYSTEM

(75) Inventor: Benjamin Vigoda, Winchester, MA (US)

(73) Assignee: Analog Devices, Inc., Norwood, MA (US)

( * ) Notice: Subject to any disclaimer, the term of this patent is extended or adjusted under 35 U.S.C. 154(b) by 953 days.

(21) Appl. No.: 14/130,380

(22) PCT Filed: Feb. 22, 2011

(86) PCT No.: PCT/US2011/025743
§ 371 (c)(1),
(2), (4) Date: May 5, 2014

(87) PCT Pub. No.: WO2011/152900
PCT Pub. Date: Dec. 8, 2011

(65) Prior Publication Data
US 2014/0250041 A1    Sep. 4, 2014

Related U.S. Application Data

(60) Provisional application No. 61/306,876, filed on Feb. 22, 2010.

(51) Int. Cl.
*G06F 17/00* (2006.01)
*G06N 5/02* (2006.01)
*G06F 9/50* (2006.01)

(52) U.S. Cl.
CPC ............... *G06N 5/02* (2013.01); *G06F 9/5066* (2013.01)

(58) Field of Classification Search
CPC combination set(s) only.
See application file for complete search history.

(56) References Cited

U.S. PATENT DOCUMENTS

| | | | |
|---|---|---|---|
| 6,771,197 B1 | 8/2004 | Yedidia et al. | |
| 7,860,687 B2* | 12/2010 | Vigoda | G06J 1/00 326/37 |
| 8,095,860 B2* | 1/2012 | Gross | H03M 13/1102 714/752 |
| 8,115,513 B2* | 2/2012 | Vigoda | G06N 7/005 326/104 |

(Continued)

FOREIGN PATENT DOCUMENTS

| | | |
|---|---|---|
| CN | 102934100 | 2/2013 |
| WO | 02/103631 | 12/2002 |

OTHER PUBLICATIONS

Privacy-preserving item-based Collaborative Filtering using semi-distributed Belief Propagation J. Zou; A. Einolghozati; F. Fekri Communications and Network Security (CNS), 2013 IEEE Conference on Year: 2013 pp. 189-197, DOI: 10.1109/CNS.2013.6682707 IEEE Conference Publications.*

(Continued)

*Primary Examiner* — Michael B Holmes
(74) *Attorney, Agent, or Firm* — Patent Capital Group

(57) ABSTRACT

In a data processing system, a method for implementing a factor graph having variable nodes and function nodes connected to each other by edges includes implementing a first function node and a on a first computer system, the first computer system being in network communication with a second computer system; establishing a network connection to each of a plurality of processing systems; receiving, at the first function node, soft data from a variable node implemented on one of the processing systems, the soft data including an estimate of a value and information representative of an extent to which the estimate is believed to correspond to a correct value; and transmitting, from the first function node to the one of the processing systems, soft data representing an updated estimate of the value.

20 Claims, 13 Drawing Sheets

(56) References Cited

U.S. PATENT DOCUMENTS

| | | | | |
|---|---|---|---|---|
| 8,458,114 | B2* | 6/2013 | Vigoda | G06N 7/005 706/52 |
| 8,627,246 | B2* | 1/2014 | Hershey | G06F 17/5027 716/100 |
| 8,633,732 | B2* | 1/2014 | Reynolds | G11C 27/026 326/104 |
| 8,792,602 | B2* | 7/2014 | Bernstein | H03M 13/1111 375/368 |
| 8,799,346 | B2* | 8/2014 | Reynolds | H03M 13/1111 708/801 |
| 8,972,831 | B2* | 3/2015 | Reynolds | G06F 11/1008 714/763 |
| 9,048,830 | B2* | 6/2015 | Reynolds | G06N 7/005 |
| 2004/0136472 | A1* | 7/2004 | Vigoda | G06J 1/00 375/316 |
| 2005/0265387 | A1 | 12/2005 | Khojastepour et al. | |
| 2007/0188354 | A1* | 8/2007 | Vigoda | G06J 1/00 341/50 |
| 2008/0294970 | A1* | 11/2008 | Gross | H03M 13/1102 714/801 |
| 2008/0305460 | A1 | 12/2008 | Garg | |
| 2009/0316988 | A1 | 12/2009 | Xu et al. | |
| 2010/0223225 | A1* | 9/2010 | Vigoda | G06N 7/005 706/52 |
| 2014/0223439 | A1* | 8/2014 | Vigoda | G06F 9/4843 718/102 |
| 2014/0250041 | A1* | 9/2014 | Vigoda | G06N 5/02 706/46 |

OTHER PUBLICATIONS

A Belief Propagation Approach to Privacy-Preserving Item-Based Collaborative Filtering J. Zou; F. Fekri IEEE Journal of Selected Topics in Signal Processing Year: 2015, vol. 9, Issue: 7 pp. 1306-1318, DOI: 10.1109/JSTSP.2015.2426677 IEEE Journals & Magazines.*

A new framework for soft decision equalization in frequency selective MIMO channels S. Bavarian; J. K. Cavers IEEE Transactions on Communications Year: 2009, vol. 57, Issue: 2 pp. 415-422, DOI: 10.1109/TCOMM.2009.02.060671 IEEE Journals & Magazines.*

Distributed Inference of Channel Occupation Probabilities in Cognitive Networks via Message Passing F. Penna; R. Garello; M. A. Spirito New Frontiers in Dynamic Spectrum, 2010 IEEE Symposium on Year: 2010 pp. 1-11, DOI: 10.1109/DYSPAN.2010.5457873 IEEE Conference Publications.*

Improving Multi-Dimensional Graph-Based Soft Channel Estimation C. Knievel; P. A. Hoeher; A. Tyrrell; G. Auer Vehicular Technology Conference (VTC Spring), 2012 IEEE 75th Year: 2012 pp. 1-5, DOI: 10.1109/VETECS.2012.6240138 IEEE Conference Publications.*

Pattern-Dependent Noise Predictive Belief Propagation M. N. Kaynak; T. M. Duman; E. M. Kurtas IEEE Transactions on Magnetics Year: 2006, vol. 42, Issue: 10 pp. 2564-2566, DOI: 10.1109/TMAG.2006.878620 IEEE Journals & Magazines.*

Probabilistic 3D mapping based on GNSS SNR measurements A. T. Irish; J. T. Isaacs; F. Quitin; J. P. Hespanha; U. Madhow 2014 IEEE International Conference on Acoustics, Speech and Signal Processing (ICASSP) Year: 2014 pp. 2390-2394, DOI: 10.1109/ICASSP.2014.6854028 IEEE Conference Publications.*

Office Action issued in Chinese Patent Application Serial No. 201180019617.2 mailed Sep. 11, 2015, 3 pages.

European Search Report issued in EP Patent Application Serial No. 11790126.4 mailed Dec. 7, 2015, 8 pages.

Joseph E. Gonzalez et al., *Distributed Parallel Inference on Large Factor Graphs*, UAI 2009, 10 pages.

Notice of Allowance in CN Patent Application Serial No. 201180019617.2, 2 pages.

Office Action issued in Chinese Patent Application Serial No. 201180019617.2 mailed May 20, 2015, 3 pages.

* cited by examiner

```
%%%%%%%%%%%%%%%%%%%%%%%%%%%%
% Build Sudoku Factor Graph
%%%%%%%%%%%%%%%%%%%%%%%%%%%% perm = BuildPermutationFactorGraph(9);

vars = Variable(1:9,9,9);

vars4D = reshape(vars,3,3,3,3);

fg = FactorGraph();

for i = 1:3
    for j = 1:3
        %rows
        fg.addGraph(perm,reshape(vars4D(:,:,i,j),9,1));
        %columns
        fg.addGraph(perm,reshape(vars4D(i,j,:,:),9,1));
        %boxes
        fg.addGraph(perm,reshape(vars4D(:,i,:,j),9,1));
    end
End %%%%%%%%%%%%%%%%%%%%%%%%%%%%%%
% Run Algorithm
%%%%%%%%%%%%%%%%%%%%%%%%%%%%%%

%Set priors for row = 1:9
  for col = 1:9
    if (puzzle(row,col) ~= 0 )
      ps = zeros(1,9);
      ps(puzzle(row,col)) = 1;
      vars(row,col).Priors = ps;
    end
  end
end %Iterate.
fg.iterate();

Valid
```

*FIG. 1*

Activity Clustering and Categorization

- The cloud performs inference jointly across streams from all devices
  - For example, clustering user activities
  - The cloud transmits marginal probabilities to the mobile devices as factor graph messages to prime further inference

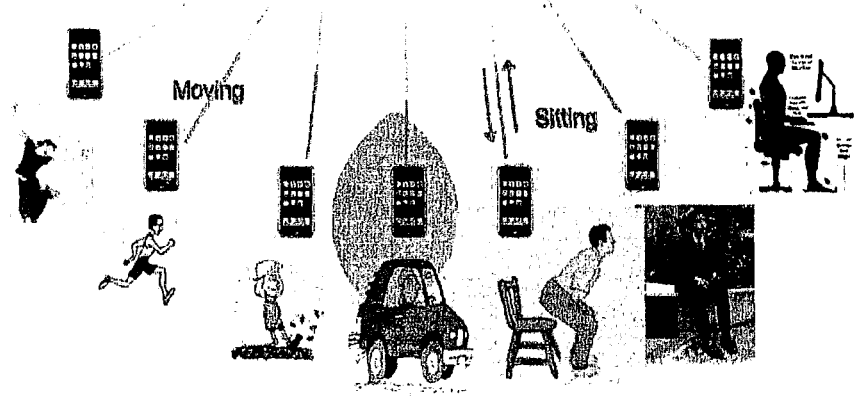

- Mobile devices collect sensor streams (audio, video, etc.)
  - Devices perform low-level inference to extract sufficient statistics for the cloud
  - Devices transmit probabilities to the cloud so that the cloud can help prime further inference

FIG. 3

```
% Factors
function valid = fa(dij,oi,oj)
    valid = (dij== oi-oj);
end function valid = fb(errij,Dij,dijx,dijy)
valid = (-errij+Dij-dijx^2-dijy^2==0);
end % Main function
function[trigd,locations]=BPtriangulation2(D,anchors,na,nm,gr,errfakedomain)
ntot=na+nm;
temp=0;
Dtable=0;
for i=1:nm
    for j=(i+1):ntot
        temp=temp+1;
        Dtable(temp,1)=i;
        Dtable(temp,2)=j;
    end
end
numpairs=temp;

% Factor graph definition
maindomain=0:gr;
diffdomain=-gr:gr;
errdomain=-errfakedomain:errfakedomain;

trigd = FactorGraph();
    for i=1:ntot
        ox{i} = Variable(maindomain);
        oy{i} = Variable(maindomain);
    end for n=1:numpairs
        dx{n} = Variable(diffdomain);
        dy{n} = Variable(diffdomain);
        errD{n} = Variable(errdomain);
    end for n=1:numpairs
        i=Dtable(n,1);
        j=Dtable(n,2); %%i should be < j
        trigd.addFunc(@fa,dx{n},ox{i},ox{j});
        trigd.addFunc(@fa,dy{n},oy{i},oy{j});
    end
```

*FIG. 6A*

```
    for n=1:numpairs
        display(['check number ' num2str(n)]);
        i=Dtable(n,1);
        j=Dtable(n,2);
        trigd.addFunc(@fb,errD{n},D(i,j),dx{n},dy{n});
    end % Priors
ps=zeros(size(errdomain));
for k=-errfakedomain:errfakedomain ps(1+errfakedomain+k)=nchoosek(2*errfakedomain,errfakedomain+k)/2^(2*err
fakedomain);
end
ps=ps/sum(ps);
for n=1:numpairs
    errD{n}.Priors = ps;
end for i=nm+1:ntot
    ps=zeros(size(maindomain));
    ps(anchors(i-nm,1)+1)=1;
    ox{i}.Priors = ps;
    ps=zeros(size(maindomain));
    ps(anchors(i-nm,2)+1)=1;
    oy{i}.Priors = ps;
end
%end definition of factor graph % Run Algorithm numiter=20;
trigd.solve();
positions=zeros(ntot,2);

for i=1:ntot
        locations(i,1)=ox{i}.Values;
        locations(i,2)=oy{i}.Values;
end
```

FIG. 6B

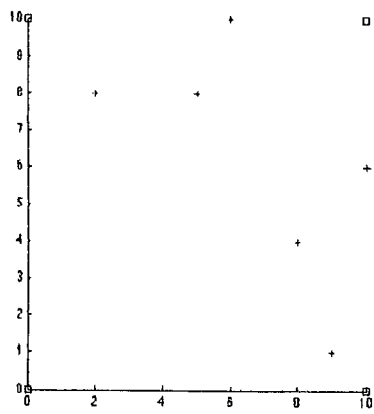 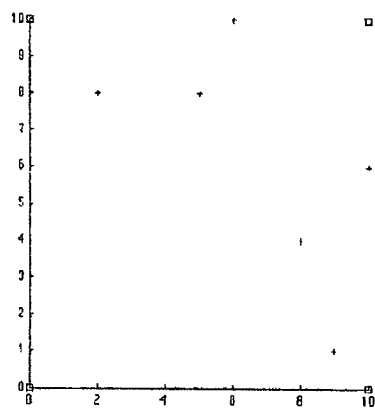
*FIG. 7A*          *FIG. 7B*

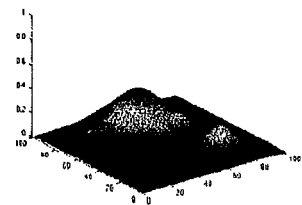 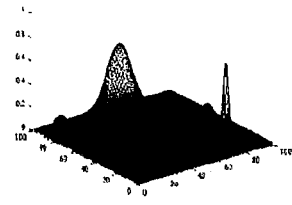
*FIG. 8A*   *FIG. 8B*
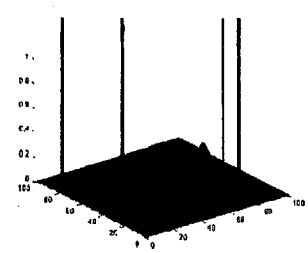 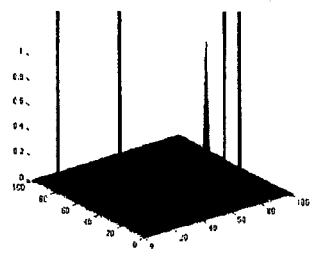
*FIG. 8C*   *FIG. 8D*
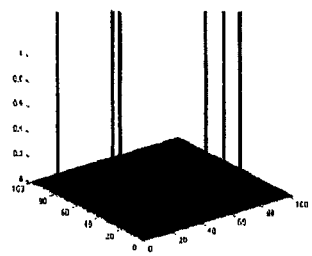
*FIG. 8E*

Lyric Semiconductor, Inc.   Analog Logic gate example: soft Equals
$$x = x' = x''$$
$$x - x' = 0$$
$$x - x'' = 0$$
their probabilities satisfy
$$p_X(1) = p_{X'}(1) p_{X''}(1)$$
$$p_X(0) = p_{X'}(0) p_{X''}(0)$$
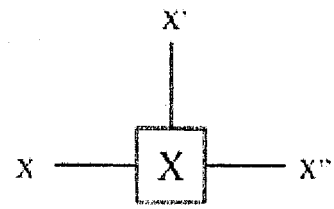
FIG. 9

DISTRIBUTED FACTOR GRAPH SYSTEM

CROSS REFERENCE TO RELATED APPLICATIONS

This application is the national phase under 35 USC 371 of international application no. PCT/US2011/025743, filed Feb. 22, 2011, and claims the benefit of U.S. Provisional Application No. 61/306,876, filed on Feb. 22, 2010. The contents of the aforementioned applications are incorporated herein by reference.

STATEMENT AS TO FEDERALLY SPONSORED RESEARCH

This invention was made with government support under FA8750-07-C-0231 awarded by the Defense Advanced Research Projects Agency (DARPA). The government has certain rights in the invention.

FIELD OF DISCLOSURE

This disclosure relates to data-processing systems, and in particular, to data-processing systems for probabilistic computation.

BACKGROUND

Today, substantial amounts of computer time are used essentially implementing Bayes formula to compute probabilities. For example, there exist on-line content distribution services that execute applications for predicting content that a consumer is likely to rate highly given content that the consumer has previously rated. Similarly, there exist retailing services that execute applications for predicting what products a consumer is likely to want to purchase given what that consumer has purchased before. Then, there exist search engines that attempt to predict what links might be relevant on the basis of search history. These applications essentially compute conditional probabilities, i.e. the probability of an event given the occurrence of prior events.

Other probabilistic applications include procedures for guessing how to translate a webpage from one language to another, and large-scale Bayesian inference, including synthetic aperture reconstruction in radar imaging, image reconstruction in medical tomography, and predicting nucleic acid sequences associated with diseases.

In the communications area, probabilistic computation arises when embedded and mobile applications in, for example, a cell phone, predict what bits were originally transmitted based on a received noisy signal. In robotics, there exist applications for predicting the most likely optimal path across difficult terrain.

SUMMARY

The invention is based on the recognition that a distributed computer system can be used to implement a graph to be used for probabilistic computations with soft data. As used herein, soft data refers to an extent to which an estimate of a value is believed to be the correct value. In a factor graph, these beliefs concerning how likely an estimate conforms to a correct value propagate from one node to another. In so doing, the beliefs become progressively stronger until it approaches near-certainty. The process of ascertaining values in this way is often called "belief propagation."

The propagation of beliefs from one node to another can be carried out across a distributed computer system connected by a local area network, a wide area network, or even a global network such as the internet. Beliefs can be made to propagate from one node to another by pulling a message from a node, or by having a node push its messages to other nodes. In the case of the internet, beliefs can be pushed by adapting the existing RSS feed mechanism, and pulled by adapting the existing hyperlink mechanism.

In one aspect, the invention features a method for implementing a factor graph having variable nodes and function nodes connected to each other by edges includes implementing a first function node and a on a first computer system, the first computer system being in network communication with a second computer system; establishing a network connection to each of a plurality of processing systems; receiving, at the first function node, soft data from a variable node implemented on one of the processing systems, the soft data including an estimate of a value and information representative of an extent to which the estimate is believed to correspond to a correct value; and transmitting, from the first function node to the one of the processing systems, soft data representing an updated estimate of the value.

In some practices, receiving the soft data includes receiving the information from a soft equals node.

Other practices include providing, to the variable node, information for generating a new estimate of the value of the variable associated with the variable node.

Alternative practices include those in which edges are implemented by a network connection, those in which the variable node includes an equals gate, and those in which a unique identifier is assigned to the variable node.

In yet other practices, receiving the soft data includes activating a hyperlink corresponding to the first function node, and transmitting the soft data includes activating a hyperlink corresponding to the first variable node.

Other aspects of the invention include a computer-readable medium having encoded thereon software for implementing any of the foregoing methods, as well as a data processing system including a server configured to execute any computer-readable media having encoded thereon software for implementing any of the foregoing methods.

In another aspect, the invention features a distributed computer system for implementing a factor graph. Such a system includes: first computer systems implementing function nodes of the factor graphs; and second computer systems implementing variable nodes of the factor graphs. The first and second computer systems are in data communication over a network.

These and other features will be apparent from the accompanying detailed description and the figures, in which:

DESCRIPTION OF THE DRAWINGS

FIG. 1 shows exemplary DMPL code for implementing a Sudoku factor graph;

FIGS. 3-5 show exemplary applications of a web solver;

FIGS. 6A-6B show DMPL code for implementing a factor graph corresponding to the example in FIG. 5;

FIGS. 7A-7B show estimates of locations of phones in the example of FIG. 5;

FIGS. 8A-8E show successive probability distributions for estimating the locations of phones in the example of FIG. 5;

FIG. 9 shows a soft equals gate used for implementing a factor graph;

DETAILED DESCRIPTION

Standard programming languages like C and C++ are ideal for writing code intended to be compiled to and run on a standalone computer such as a PC or even on a super-computer cluster. Similarly, existing probability programming languages are good for writing probabilistic graphical models or generative models to be solved on a standalone computer or even on a standalone super-computer such as the Amazon cloud.

Because of the growing importance of probabilistic programming, an academic renaissance has emerged in probability programming languages. An early example of a probability programming language is IBAL, which was created by Avi Pfeffer in 1997. Known languages include Alchemy, Bach, Blaise, Church, CILog2, CP-Logic, Csoft, DBLOG, Dyna, Factorie, Infer.NET, PyBLOG, IBAL, PMTK, PRISM, ProbLog, ProBT, R, and S+. Most of the other languages in this list have been created in the last 5 years. The first conference on Probability Programming Language was the NIPS 2008 Conference, which was held beginning Dec. 13, 2008 in Whistler, Canada.

One such probability programming language is the Distributed Mathematical Programming Language (DMPL), which is described in U.S. Provisional Application 61/294,740, filed Jan. 13, 2010, and entitled "Implementation of Factor Graph Circuitry."

Figure 2:
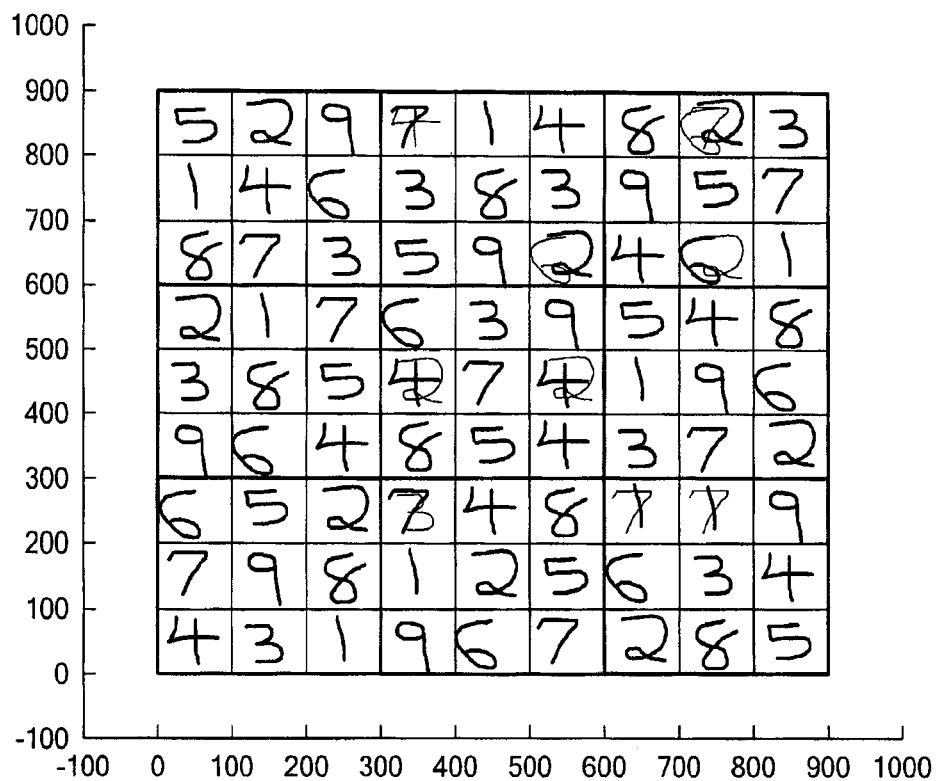
FIG. 2 shows a Sudoku array during an iteration of the process implemented by FIG. 1.

DMPL has been used to create a number of interesting demos. FIG. 1 shows exemplary DMPL source code for implementing a Sudoku solver. The DMPL source code essentially describes the rules of the game. During execution, a solver iteratively anneals to a satisfying solution of the constraints. FIG. 2 is a snapshot of a solution at an intermediate point in the annealing process. Note that the guesses in some squares are still in superposition.

However, there has been no web-based probability programming language suitable for carrying out probabilistic computation between processors connected across a network, such as the internet. Nor does there exist a web service for carrying out probabilistic computations, hereafter referred to as a "web solver."

A web solver can be viewed as implementing a factor graph in which constraint nodes and variable nodes are connected by edges. Typically, the constraint nodes would reside in a cloud, and the variable nodes would reside on local devices. Factor graphs provide a known way to determine the most likely combination of variables given constraints among the variables. Such factor graphs operate by beginning with an initial set of variables, and allowing the variables to converge to their most likely values after multiple iterations.

A number of practical applications exist for a web service that implements a factor graph for probabilistic computations. For example, in such a service, mobile devices could collect sensor streams, such as audio and video data, and perform low-level inference to extract statistics for transmission to a cloud. These statistics could include the probability of certain events occurring. The cloud would receive streams of data from multiple devices, as shown in FIG. 3, and perform inferences jointly across those streams. Such inferences can include activity clustering and categorization. The cloud would then transmit marginal probabilities to the mobile devices as factor graph messages to prime further inference.

Figure 4:
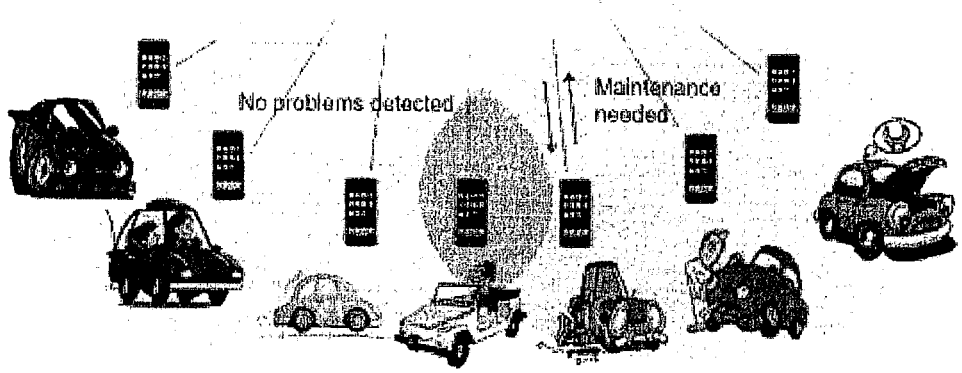

Another example would involve the prediction of engine failure in an automobile, as shown in FIG. 4. In such a case, each user would register his automobile's year, make and model with the cloud. Mobile devices would then collect engine noise audio and information from the vehicle computer. The mobile devices would use this data to extract statistics for transmission to the cloud. The cloud would then cluster automobiles on the basis of their condition, and transmit marginal probabilities to the mobile devices as factor graph messages. These messages would prime the devices to look for specific signatures in the data.

Figure 5:
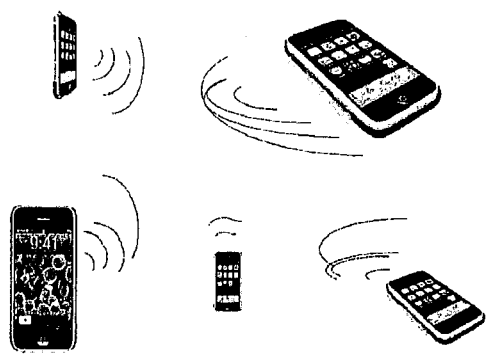

Another example is that of enabling a plurality of suitably equipped mobile devices, such as personal digital assistants or cell phones, to mutually triangulate their relative positions by emitting ultrasound and measuring the amplitude of received sounds from neighboring devices, as shown in FIG. 5. Exemplary DMPL code for carrying out this function is shown in FIGS. 6A-6B.

FIGS. 7A-7B shows the solution progressing from an estimate after two iterations in FIG. 7A to an improved estimate after five iterations in FIG. 7B. The actual positions of the devices are shown as blue crosses, and the solver's estimates of location are shown as green circles. The solver's successive estimates are in fact probability distributions with two spatial variables. The variances of these distributions decrease with each iteration of the solver. Five successive estimates are shown in FIGS. 8A-8E.

In all of these examples, the mobile devices or other client devices (such as laptops, PC's, or embedded processors) have sensors or other I/O devices that enable them to interact with the physical world.

The preceding examples also involve a computing "cloud." The computing cloud is commonly understood to be a set of server farms that are accessible over the web, for example over the internet and/or a wireless network. However, a computing cloud could also be a less elaborate arrangement, such as that described in connection with FIG. 5, in which the "cloud" could simply be a laptop near the phones that has more processing power than the phones. The clients and the cloud can therefore communicate to one another via a communication protocol such as the http protocol.

Various other relationships can exist between the cloud and the client devices. For example, in one embodiment, communication is one-way: clients only communicate to the cloud, but the cloud does not communicate to the client. In another embodiment, communication is bi-directional or multi-directional. In another embodiment, there is no "cloud" or "server" at all, but rather a "mesh" or "ad hoc" network of devices that are in communication with each other.

In one embodiment, a probability programmer(s) would create a Bayesian model (such as a probabilistic graphical model or generative model) that relates variables to one another. For example, in the cell phone acoustic location example described in connection with FIG. 5, the model would be a set of trigonometric constraints that enforce consistency on the allowable locations of a set of phones given (noisy) information about their relative distances from one another. This model could be hosted on the cloud. In this example, the cloud might just be a laptop that is in communication over a network with the phones.

Another way to implement the procedure described in FIG. 5 is for each client (i.e., each phone) to have a probabilistic graphical model with just a single variable representing the client's position in Euclidean space. Associated with this variable would be a prior estimate of the client's position from its GPS receiver subsystem. For convenience, we refer to the variable representing the first phone's location as "1". The second and third phones will have variables named "2" and "3" respectively to identify their locations.

In one of the most popular species of probabilistic graphical models (Forney factor graphs), a variable node is also known as an equals gate. However, regardless of what it is called, a variable node's function is the same: to aggregate various estimates for a value of a variable and redistribute a new estimate for that value. For example for a binary variable, X in {0,1}, the equals gate would be of the form shown in FIG. 9.

Each client has a model for its position. This model is embodied in a single variable node or equals gate. This node can estimate the position of the client, and send outgoing messages (marginal probabilities) for the position of the client. The node can also receive messages that will influence its estimate for the position of the client.

In a conventional probabilistic graphical model, each of these client position nodes 1, 2 . . . would be connected by edges to one or more constraint nodes (also known as "function nodes") in the model. In the client location example of FIG. 5, the constraint nodes would enforce consistency on the allowable locations of the clients by enforcing trigonometric identities that hold true for clients existing in Euclidean space. Exemplary DMPL source code for implementing these constraints is shown in FIGS. 6A-6B.

Given the factor graph and prior information for some or all of the variables, a solver algorithm (such as the sum-product algorithm) can then perform iterative message passing across edges in the graph to produce estimates for the clients' positions. This all generally happens on one computer. In the past, algorithms like the sum-product have been parallelized on multi-core computers or super-computers by multi-threading, batch queuing, or the like.

However, in client localization example of FIG. 5, a client location node is stored and computed on the client with which it is associated, while constraint nodes are stored and calculated on a cloud, which could be implemented on nearby laptop. The cloud could also store and compute other variable nodes that rely on a priori knowledge of other constraints. In the specific example show, one constraint might be that all clients are on a table having a known size and shape. In that case, there would be constraints on how far apart all the clients could be from one another.

There is no easy way to implement this system with existing probability programming languages, in part because there is no easy way to pass messages between the clients and the cloud, or from one client to another. One generally has to go outside of the probability programming language and send probabilities to separate software that handles web communications.

The foregoing disadvantage is overcome by having the edges in the graph be network connections. In this scheme, each variable receives a URL or other unique identifier. The probability program itself is like an .XML or .HTML document, in that it is hosted on a web solver. The web solver re-computes this variable upon receiving a request for its value, i.e. a request for that URL. Alternatively, the variable node can be regularly recomputed and syndicated by, for example, an RSS feed.

This web-based probability programming and probability solving infrastructure makes possible large distributed networks of modelers and solvers. For example, climate modelers on different continents could each build a model of the weather dynamics on their continent. They could then link their models to other models using soft-equals-hyperlinks. If they hosted their models on a server, and syndicated their current weather predictions, the other servers would have this information made available to them over the soft-equals-hyperlinks These other servers could, in turn, update their own forecasts. In this way probabilistic messages (marginals, particles, parameters, etc.) can be seamlessly passed over the network, and all parts of the model can be updated appropriately, despite being hosted on different computers in different locations.

Figure 10:
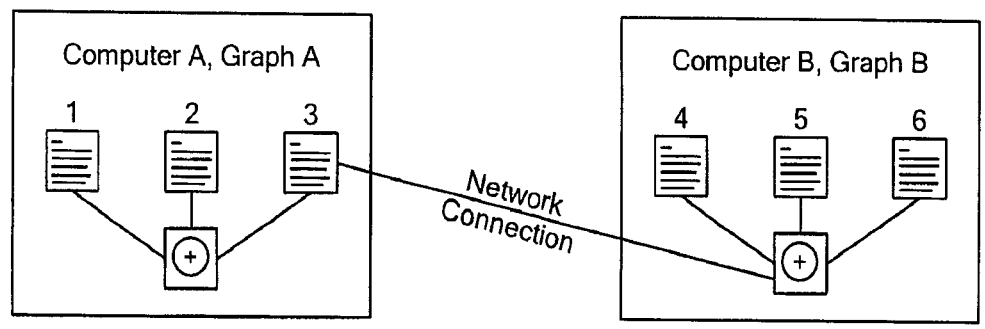
FIG. 10 shows two factor graphs connected to form a larger factor graph by having an edge that spans a network.

FIG. 10 illustrates first and second factor graphs in which a variable node on one factor graph connects to a constraint node on another factor graph, with the connecting edge traversing a network. Message passing between these two nodes is conveniently carried out by hyperlink or RSS feed. The net effect is a larger factor graph whose existence arises as a result of a network connection.

Figure 11:
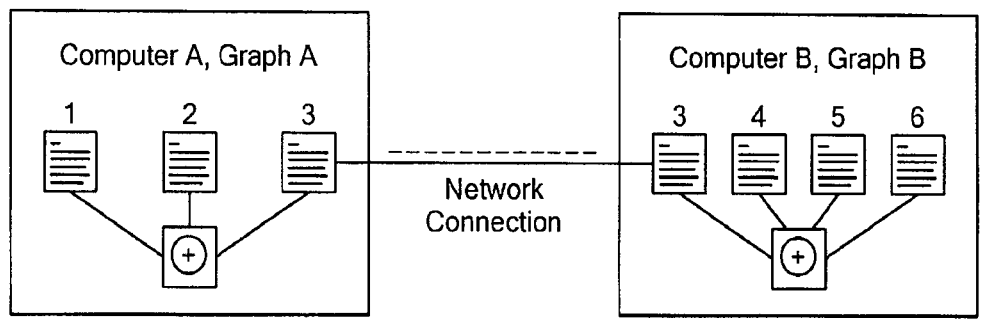
FIG. 11 shows replication of a variable between two factor graphs connected to each other via a network.

FIG. 11 illustrates first and second factor graphs, each of which implemented on different clients connected to each other via a network. One variable node in the first factor graph is effectively made common to both factor graphs via a network connection between the two clients. While the example shown in FIG. 10 is simple, it is apparent that the architecture shown in FIG. 10 can readily be extended to multiple hyperlinks between multiple factor graphs.

Figure 12:
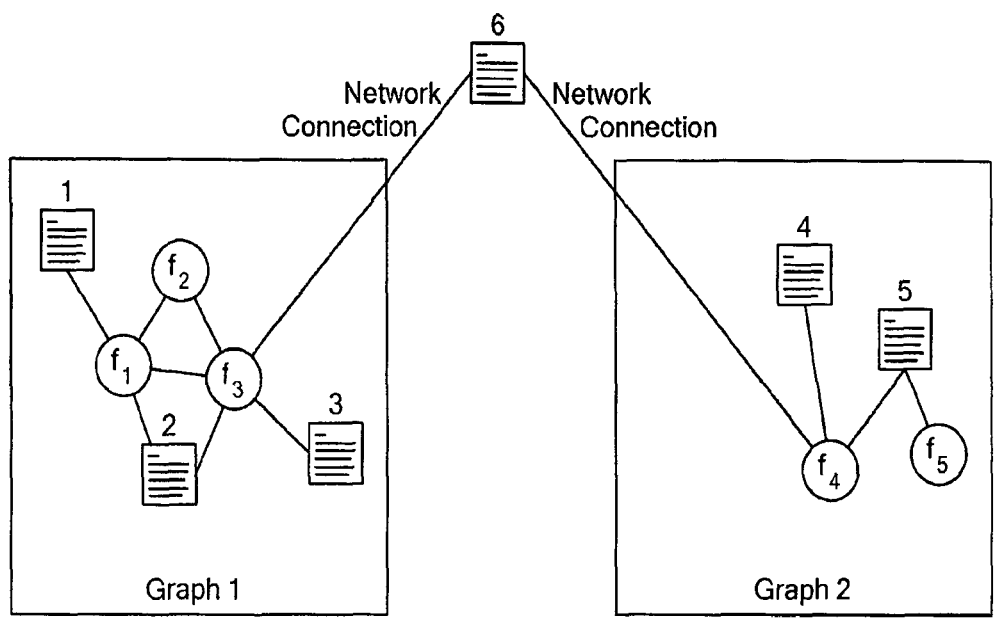
FIG. 12 shows two factor graphs, each of which is connected to a common equals node of a third factor graph via a network.

FIG. 12 illustrates a similar configuration, in which two clients are connected to a server, with the common variable node now residing on the server rather than on the clients. The variable node in FIG. 12 is accessible via a hyperlink from any client.

In certain algorithms, such as Gibbs sampling, there is no equals gate. Nevertheless, there are variable nodes that receive updates from neighboring constraint nodes. In a Gibbs sampling web solver (and in similar embodiments), variable nodes are hyperlinked to constraint nodes and constraint nodes are hyperlinked to variable nodes without the need for equals gates.

In certain solver algorithms, such as the sum-product algorithm, the order in which messages are updated in the graph can make a difference to the final answer that is computed for a given graph. In conventional implementations, the message update schedule is under global control by the solver algorithm on a single computer. However, in a distributed factor graph, it can be difficult to maintain global control over which particular messages are updated and which order.

The flooding schedule is the most well known schedule for the sum-product algorithm. In a flooding schedule, initial messages from equals gates to function nodes are computed. Then once this is completed, messages are passed from the constraint nodes to the equals gates.

Another approach to the scheduling problem described above is to have a centralized server that synchronizes all message passing, as described in connection with FIG. 5.

A centralized server can have a number of drawbacks when used in connection with a larger and less centrally organized system. Even if it were possible to keep track of all messages in a huge network and to somehow guarantee that they obeyed the flooding schedule, such a protocol might lead the entire network to lockup if one server were down or unable to deliver the messages from its variables to their destination constraints, or its constraints are unable to deliver their messages to their corresponding variables.

Another approach to the scheduling problem described above is a randomized schedule in which messages in the graph are updated randomly. This kind of schedule seems more amenable to distributed message passing over the network as described herin.

I claim:

1. In a data processing system, a method for implementing a factor graph having variable nodes and function nodes connected to each other by edges, said method comprising:
   implementing a first function node and a on a first computer system, said first computer system being in network communication with a second computer system;
   establishing a network connection to each of a plurality of processing systems;
   receiving, at said first function node, soft data from a variable node implemented on one of said processing systems, said soft data including an estimate of a value and information representative of an extent to which said estimate is believed to correspond to a correct value; and
   transmitting, from said first function node to said one of said processing systems, soft data representing an updated estimate of said value.

2. The method of claim 1, wherein receiving said soft data comprises receiving said information from a soft equals node.

3. The method of claim 1, further comprising providing, to said variable node, information for generating a new estimate of said value of said variable associated with said variable node.

4. The method of claim 1, wherein said edges are implemented by a network connection.

5. The method of claim 1, wherein said variable node comprises an equals gate.

6. The method of claim 1, further comprising assigning a unique identifier to said variable node.

7. The method of claim 1, wherein receiving said soft data comprises activating a hyperlink corresponding to said first function node, and transmitting said soft data comprises activating a hyperlink corresponding to said first variable node.

8. A distributed computer system for implementing a factor graph, said system comprising:
   a first computer system implementing function nodes of said factor graphs;
   a second computer system implementing variable nodes of said factor graphs;
   wherein said first and second computer systems are in data communication over a network.

9. The method of claim 7, wherein receiving said soft data comprises receiving said information from a soft equals node.

10. The method of claim 7, further comprising providing, to said variable node, information for generating a new estimate of said value of said variable associated with said variable node.

11. The method of claim 7, wherein said edges are implemented by a network connection.

12. The method of claim 7, wherein said variable node comprises an equals gate.

13. The method of claim 7, further comprising assigning a unique identifier to said variable node.

14. The system of claim 8, wherein:
   the first computer system implements a first function node,
   the first function node is configured to receive soft data from a variable node implemented on one of a plurality of processing systems, said soft data including an estimate of a value and information representative of an extent to which said estimate is believed to correspond to a correct value, and
   the first function node is configured to transmit to said one of said processing systems, soft data representing an updated estimate of said value.

15. The system of claim 14, wherein the first function node receiving said soft data comprises activating a hyperlink corresponding to said first function node, and transmitting said soft data comprises activating a hyperlink corresponding to said first variable node.

16. The system of claim 15, further comprising the first function node providing, to said variable node, information for generating a new estimate of said value of said variable associated with said variable node.

17. The system of claim 15, wherein said variable node comprises an equals gate.

18. The system of claim 15, wherein said variable node is assigned a unique identifier.

19. A data processing system for implementing a factor graph having variable nodes and function nodes connected to each other by edges, said system comprising:
   means for implementing a first function node on a first computer system, said first computer system being in network communication with a second computer system;
   means for establishing a network connection to each of a plurality of processing systems;
   means for receiving, at said first function node, soft data from a variable node implemented on one of said processing systems, said soft data including an estimate of a value and information representative of an extent to which said estimate is believed to correspond to a correct value; and
   means for transmitting, from said first function node to said one of said processing systems, soft data representing an updated estimate of said value.

20. The system of claim 19, wherein means for receiving said soft data comprises means for activating a hyperlink corresponding to said first function node, and means for transmitting said soft data comprises means for activating a hyperlink corresponding to said first variable node.

* * * * *